D. E. Somes,
Cooling App's.

No. 96,048. Patented Oct. 19, 1869.

Attest. Inventor.

D. E. Somes,
Cooling Apparatus.

No. 96,048. Patented Oct. 19, 1869.

Attest.
F. Somes
Edw. S. Eils

Inventor.
D. E. Somes

D. E. Somes.
Cooling App's.

No. 96,048. Patented Oct. 19, 1869.

Attest. Inventor.

D. E. Somes.
Cooling App's.

No. 96,048. Patented Oct. 19, 1869.

Attest.
C. Somes
Bedioff Eig

Inventor.
D. E. Somes

D. E. Somes.
Cooling Apts.

No. 96048.   Patented. Oct. 19 1869.

Attest.   Inventor.

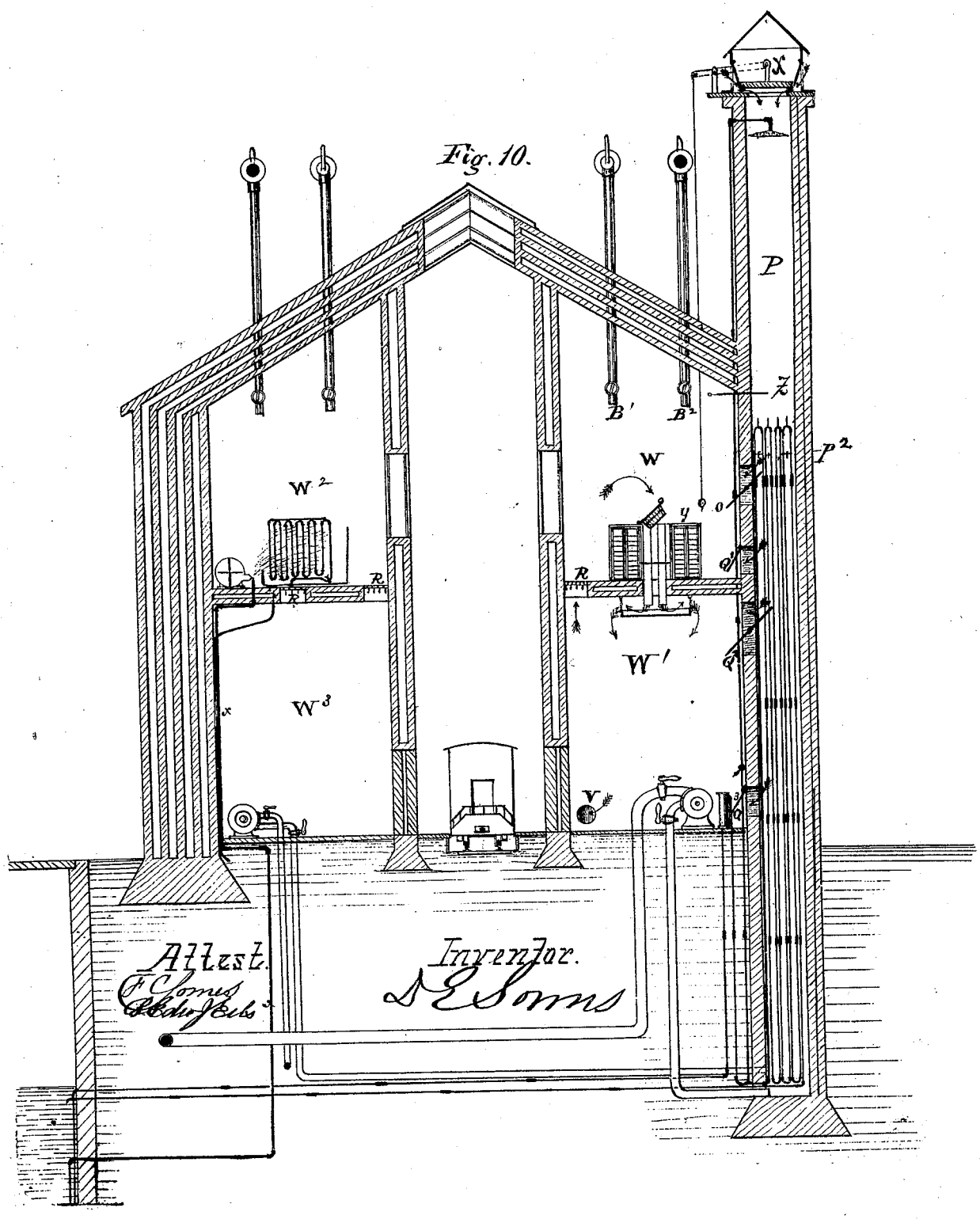

UNITED STATES PATENT OFFICE.

D. E. SOMES, OF WASHINGTON, DISTRICT OF COLUMBIA.

IMPROVED PROCESS AND APPARATUS FOR COOLING AND PRESERVING PERISHABLE ARTICLES.

Specification forming part of Letters Patent No. 96,048, dated October 19, 1869.

*To all whom it may concern:*

Be it known that I, DANIEL E. SOMES, of Washington, District of Columbia, have invented a new and useful Process for Cooling and Preserving; and I do hereby declare that the following is a full, clear, and exact description thereof, reference being had to the annexed drawings, making part of this specification, in which—

Figure 1:
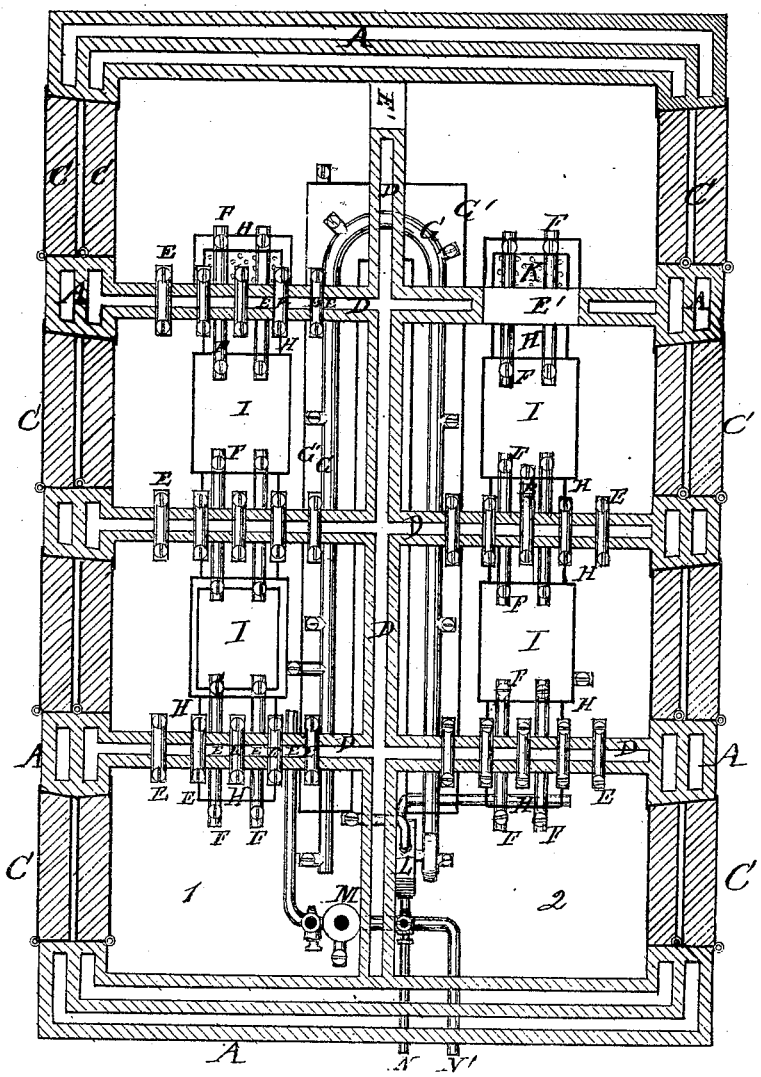
Figure 2:
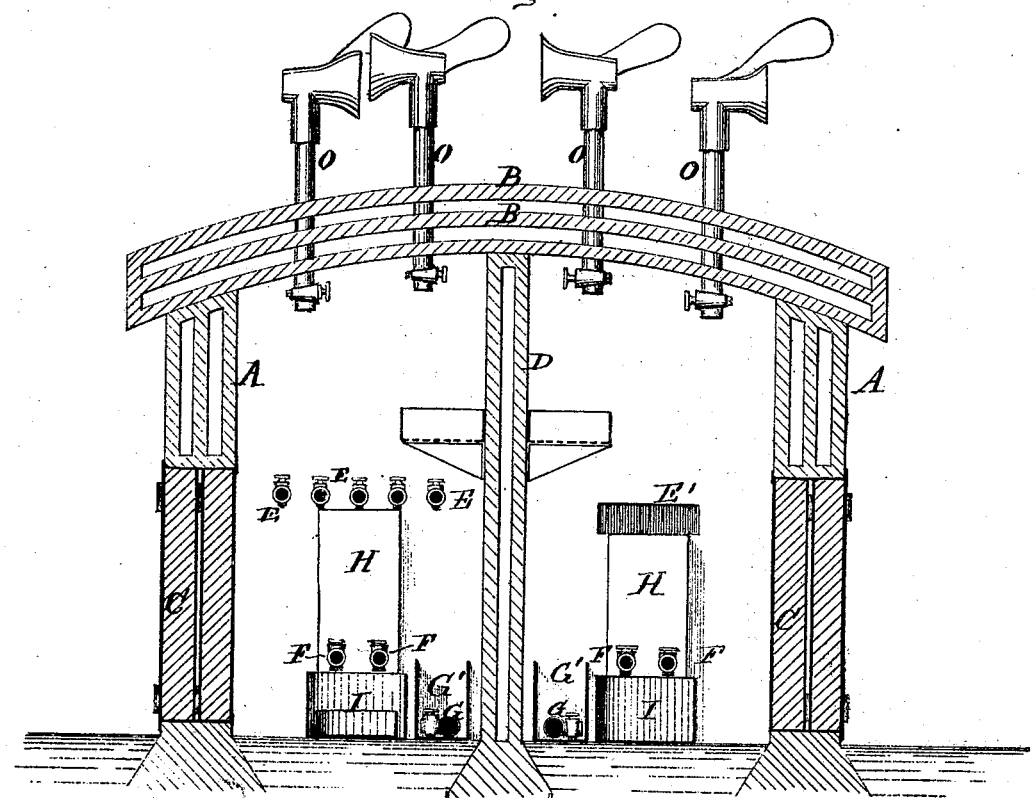
Figure 3:
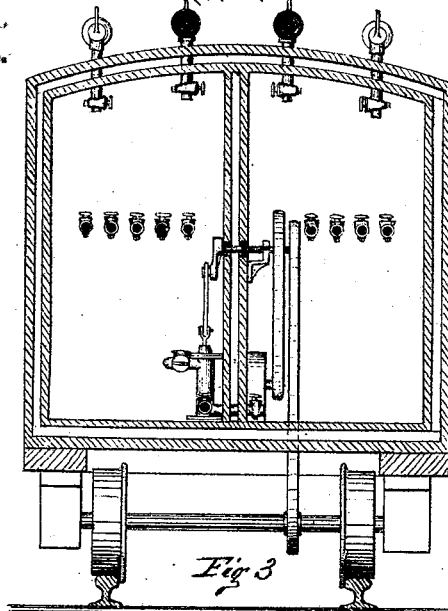
Figure 4:
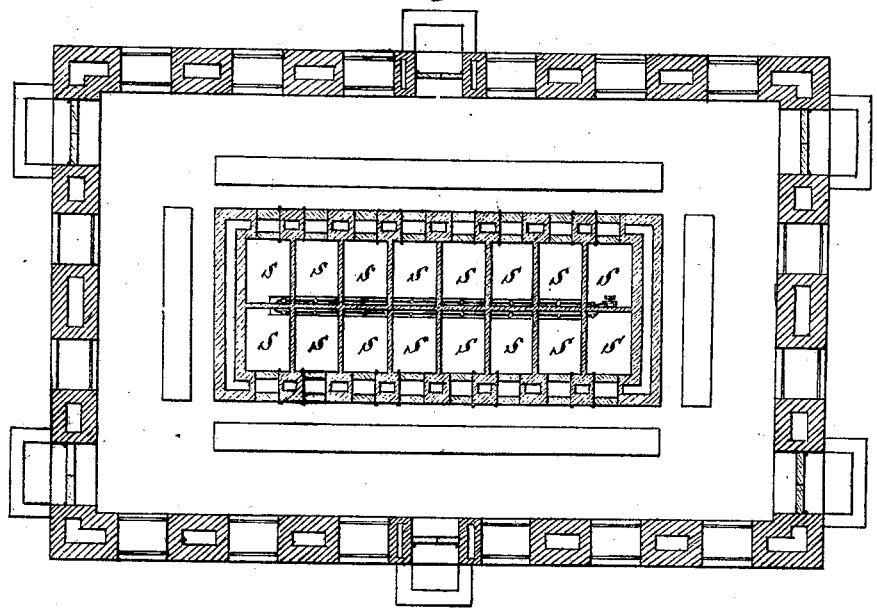
Figure 5:
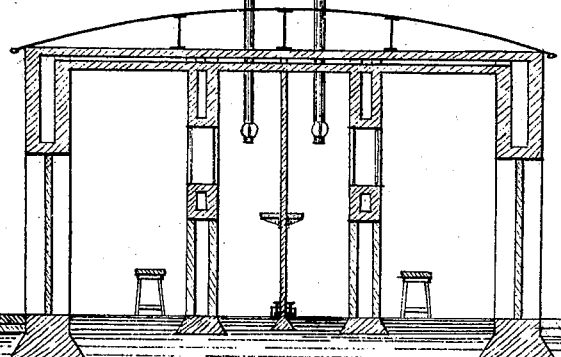
Figure 6:
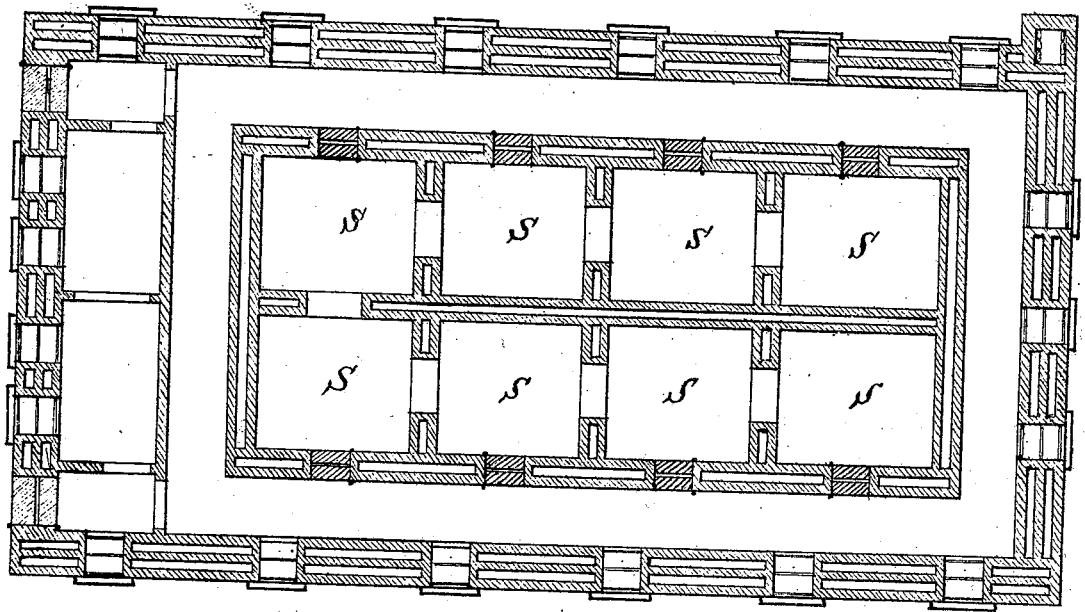
Figure 7:
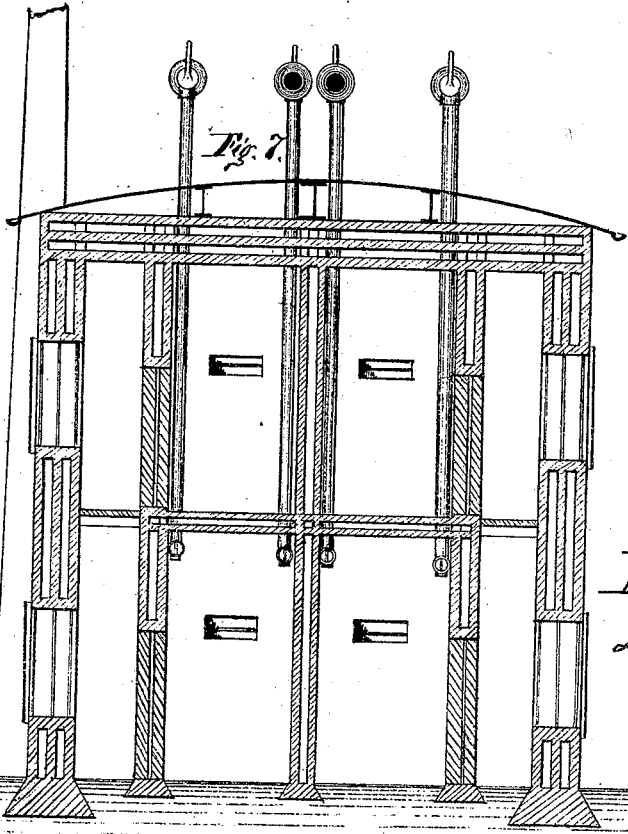
Figure 8:
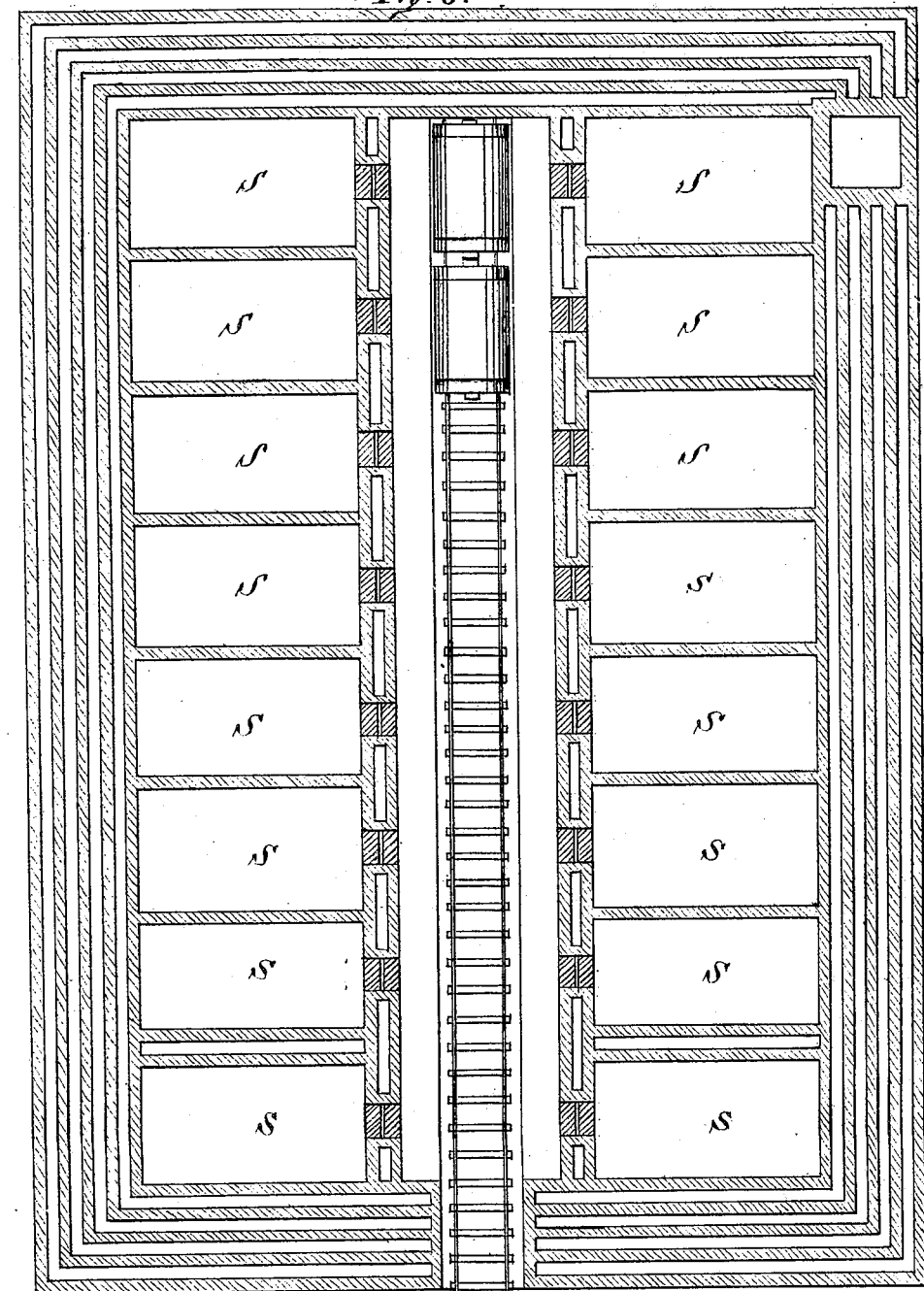
Figure 9:
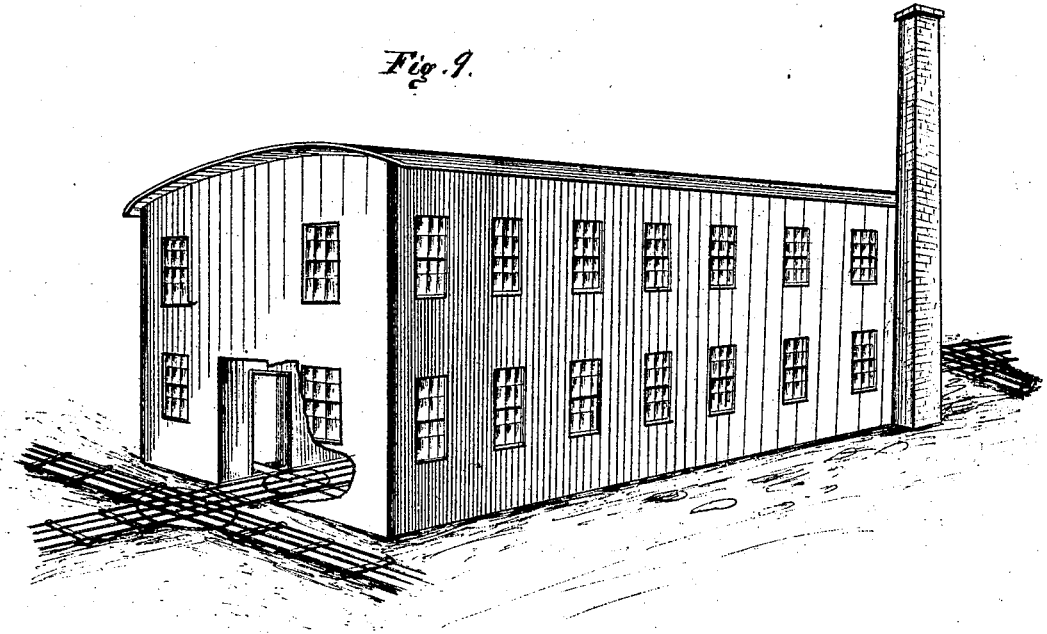
Figure 11:
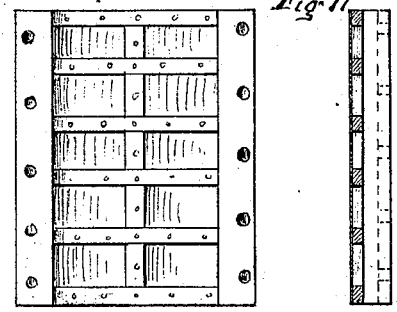

Figure 1 represents a plan view, showing devices applicable to a preserving-house, meat-packing house, refrigerator, car, or ship for transporting perishable articles, &c. Fig. 2 is a transverse section thereof. Fig. 3 is a vertical transverse section of a car provided with some of the devices shown in Fig. 1. Fig. 4 is a plan view of a market-house, with cells or preserving-rooms wherein a portion of the cooling and ventilating apparatus shown in Fig. 1 is arranged, and which may be provided with any or all of such devices. Fig. 5 represents a transverse vertical section thereof, showing part of the ventilating devices. Fig. 6 represents a plan of a building for storing and preserving fruits, meats, fish, vegetables, and other perishable articles, said building being designed to contain any or all of the devices shown in Figs. 1, 2, and 10. Fig. 7 is a transverse section of the same. Fig. 8 is a plan of a store-house, packing-house, or market-house, showing a railroad in its interior, so that cars may be run into it, to facilitate the storage and removal of perishable articles, as well as to obviate the necessity of exposing them during transfer to a temperature unfavorable to their preservation. Fig. 9 is a perspective view of such a building. Fig. 10 represents a transverse section of the above building, showing an air-duct with a series of water-pipes arranged therein for the purpose of cooling the air as it falls or is forced or drawn in by a fan or an equivalent device. It also shows a well or trench from which water is pumped and forced into said series of pipes. It also shows an arrangement of valves or dampers in the air-duct, and registers in the floors and partition-walls for purposes of ventilation. Fig. 11 represents views of a screen to be placed over or before the windows of any of the above buildings, for the purpose of mitigating the heat of the sun's rays.

The letters referred to hereinafter are those appearing in Figs. 1 and 2, unless otherwise stated.

My invention relates to cooling and purifying air and liquids in buildings, apartments, cars, vessels, refrigerators, and the like, for preserving food and other articles, and storing the same.

It also relates to producing different degrees of temperature, and devices for regulating the same, for purposes of ventilation, manufacture of ice, &c.

It also consists in the construction and arrangement of buildings, apartments, cars, refrigerators, and the like, for the various purposes as herein set forth, and for other purposes.

To enable others skilled in the art to make and use my invention, I will proceed to describe its construction and operation.

A represents the exterior walls of a building, which may be constructed of any required size, and contain one or more stories, to adapt it to the purpose for which it is to be used. The walls may be made of any suitable material, preference being given, however, to those kinds which are inferior conductors of heat, such as poplar, pine, and other soft woods, although, when constructed of bricks, plaster-of-paris, fire-brick, stone, or other ordinary building material, heat or cold may be excluded, so as to produce a nearly uniform temperature within the building at all seasons, if a sufficient number of air-chambers, or chambers filled with good non-conductors, is in such walls.

B represents a series of roofs or floors beneath the roof, which are to be constructed with air-chambers, or chambers filled with good non-conductors, as set forth in sundry Letters Patent already granted to me.

The floors of buildings should also be multiple when it is desirable to have the temperature of the building lower than that of the earth.

The series of windows or lights in the roof or walls, or both, should correspond in number to the number of walls, and having air-tight spaces between them, and, for the purpose of excluding or mitigating the heat of the sun's rays, I propose to arrange a transparent screen, made of cloth or other suitable material, and painted white, a few inches above or before such windows, and in such a manner that a free circulation of air between the glass and said screen is allowed, as shown in Figs. 6, 7, and 11.

C represents a series of double or multiple doors covering apertures formed in the walls, for the purpose of admitting of ingress into and egress out of the building. These doors are to be fitted air-tight, as nearly as may be possible, and for this purpose I provide their edges with india-rubber tubing, as described in Letters Patent granted to me for such devices.

D D represent partition-walls dividing the interior of the building into any desirable number of compartments. It is desirable to have one longitudinal partition, as shown, forming chambers at each side thereof. These partitions may also be made multiple like the exterior walls.

E E, &c., represent pipes or tubes, extending through the partitions, through which the air circulates from chamber to chamber, or is forced or drawn, said pipes being placed in the walls just above the boxes, tanks, or vessels H, soon to be described.

F F, &c., represent tubes or pipes placed in the partition-walls, below the pipes E, and extending through the boxes H.

All these pipes are provided at each end with valves or cocks.

Apertures, as shown at E', may be used instead of the above pipes, and the air may pass directly through the mass of cooling substances or mixtures in the boxes H, instead of through said pipes. In this case the apertures are provided with suitable dampers or shutters.

G represents a pipe, placed in a box or other vessel, G', containing ice, ice and salt, or other cold substance or mixture, said pipe having lateral branches provided with cocks or valves for conducting its contents, whether air or other gas, or liquid, to one chamber or more.

H represents boxes, vats, tanks, or other vessels for containing brine, ice, ice and salt, or other freezing mixtures, on one side of the partition; and those on the other side may contain the same, or, instead of that, meats, fruits, fish, or any substance intended to be cured, cooled, preserved, or frozen.

I represents vats or vessels in which articles such as meat, fruits, &c., or beer, ale, and the like are to be placed for preserving or cooling purposes. Or such pans may contain water to be converted into cakes of ice, said pans being of various sizes and forms, and being in their bottoms provided with figures which will appear in the ice indicating the number of pounds each block weighs, thereby saving much time in its delivery, and a large amount of waste.

K represents boxes provided with perforated bottoms or false bottoms or walls for the reception of charcoal, lime, chloride of lime, or other purifying substances. Other like vessels may contain, like the boxes H, ice, ice and salt, or other cooling substances or mixtures herein set forth, or set forth in sundry Letters Patent already granted to me, through which air may circulate or be forced or drawn.

Vessels located at any other point containing the above purifying substances may be used with or without forcible circulation of air.

L represents a fan-blower, and M a pump, both so arranged as to be operated by any convenient motor for forcing or drawing, or forcing and drawing air or other gas through pipes E F, or apertures E', or for drawing air through pipes or channels N N', connected with the air without the building, or for producing a continuous current within an apartment, said current, if desired, passing through charcoal, chloride of calcium, or other purifying substances, and may also be medicated or perfumed.

This pump and blower are also used for forcing or drawing air through an air-duct, P, Fig. 10, when such air-duct is used in combination with any devices herein set forth, as also for drawing or forcing air through pipes or channels in the earth, as described in sundry Letters Patent already granted to me, whether such channels or pipes be connected with said air-duct or not.

O represents pipes or ventilators extending through the roofs of the building, and provided with cocks or valves.

P, Fig. 10, represents an air-duct, provided in its inner side with valves Q, for admitting the air into the apartments. A series of pipes is arranged in this air-duct, as shown in the drawings, through which water is forced by means of a pump, or circulated by means of a hydrant, for the purpose of cooling the air as it descends. A shower-bath is also arranged in the duct above the water-pipes, to aid in the cooling and increase the downward current of air.

R in Fig. 10 represents registers in the floor, through which air may circulate or be forced or drawn.

S represents the chambers in the different structures.

The operation of my devices for cooling, freezing, and purifying may be described as follows: If I desire to draw air from the outside of the building and circulate it through the different chambers, I open all the valves or cocks, or damper in the pipes and start the blower. The air is drawn through the pipe N and forced into chamber 1, from which it escapes through the tubes or apertures to the next chamber, and so on through the whole number of compartments. By this means I produce thorough ventilation.

When I wish to lower the temperature from 50° to, say, 33° above zero, for purposes of preserving fruit, salting meat, &c., or keeping meat fresh, I close the valves in the ventilators O and pipes N N', and also partially close the valves or cocks in pipes E and F in chamber 1, the effect of which is to draw air by means of the fan from the chamber 2, and force it into chamber 1, thereby producing a partial vacuum in the chambers between the chamber 1 and the fan or blower, and compression in the chamber 1. As the air escapes from the latter into the intermediate chambers through the pipes extending through the boxes or vessels H filled with cold substances or mixtures, or through the pipe immediately over the surface of said tanks or boxes, the expansion of the air lowers the temperature in said chambers, the air being at the same time purified by passing it through charcoal or other purifying substances.

When I desire to lower the temperature far below the freezing-point, I put the pump in motion, and close the valves in pipes E and F, so as to produce a greater degree of condensation in chamber 1, and a greater degree of vacuum in the other chambers, whereby the desired result is obtained.

When it is desirable to cool or refrigerate any given chamber, without affecting the temperature of the others, I close the valves in the pipes E and F in all the chambers, and the valves in the branches of pipe G, except the one in chamber 1 and the one in the chamber designed to be cooled or refrigerated. Thus the air from the pump or blower is forced from the chamber 1 into pipe G, and thence to the apartment to be cooled or refrigerated.

The operation of the air-duct and its adjuncts (shown in Fig. 10) is as follows:

Water forced from a reservoir in the earth is made to circulate through the pipes in the air-duct, alternately ascending and descending deep into the earth and up the air duct, whereby it is cooled by the low temperature of the earth some ten to forty feet below its surface, and again partially warmed by the warm air descending the duct.

In using water from a reservoir, instead of pumping it from wells, it will be found at times to be too low to rise to the top of the pipes shown in the air-duct in Fig. 10, and, consequently, it would not circulate from one pipe to another. To obviate this I connect each pair of pipes by means of cross-tubes $P^2$ at various altitudes, provided with cocks, through which the water is conducted. This air, as it is cooled, falls or is forced through the valves into the rooms W $W^1$, and, as it becomes warm or vitiated, passes out through the ventilating-tube $B'$.

If ventilation is not desired the air in rooms W and $W^1$ will be cooled over and over again by circulating through valves or openings Q and registers R. In this case the valve X is closed, the damper Z in the duct being open or closed, as desired, and the air in the duct being in contact with the cold surfaces of the water-pipes, and, consequently, colder and heavier than that in the rooms, will fall by its own gravity into the lower room $W^1$, and, as it becomes warm therein, will rise through the registers R, and again pass through the opening Q into the duct to be cooled again. Thus a constant circulation of air is kept up, and the temperature equalized.

The pipe V (also shown in Fig. 10) is designed to, or may, connect with the pipes N and $N'$ in Fig. 1. Thus by closing the valves X and $Q^2$ and $Q^3$, and opening Q and $Q^1$ and valve in pipe V, all in Fig. 10, the pump or blower in Fig. 1 being set in motion, will draw the air from the air-duct in Fig. 10 through an ice-box, Y, in same figure, and force it through the cooling devices shown in Fig. 1, or the blower (shown in room $W^1$ in Fig. 10) will force the air through the same devices.

In order to economize in the use of cooling substances, such as ice, ice and salt, &c., which are expensive, the air may first be drawn or forced through channels in the earth, and then into the air-duct P, from which it escapes into room W, thence through the ice-box Y and pipe V to the devices shown in Fig. 1, or any other desired place, the damper Z and valves $Q^2$ $Q^3$ in the air-duct, and the register R in the floor between W and $W^1$, being closed.

The ice-box Y in Fig. 10 may be used for cooling and circulating the air in rooms W and $W^1$ independently of the air-duct and blower. In this case all the valves in the duct are closed, and also the one in pipe V, and the motion of the blower stopped.

By opening the ice-box Y the air in room W comes in contact with, and, as it is cooled, passes down through the pipes in the ice-box and into the room $W^1$, displacing the warm air therein, which rises through the open register R into the upper room. Thus a continuous current is produced, and by opening or closing the ice-box the current and the temperature of the air may be regulated.

In room $W^2$ of Fig. 10 I have shown devices for cooling air or liquids by means of atomizing liquids, or blowing and forcing the spray or mist upon a system of pipes, through which air or other gas or liquids may be made to circulate, and be forced or directed to any desired locality. Instead of drawing liquids by means of the blower through the pipe X, and force it against such system of pipes, the blower may be used for drawing air or other gas through such pipe X from pipes or channels in the earth, or extending through tanks or other vessels containing refrigerating substances. Charcoal is placed at convenient points in the channels or boxes or pipes through which the air circulates.

Figure 12:
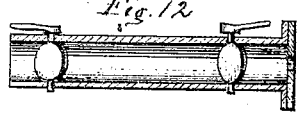

To reduce friction of the air in the pipes E and F and some others, I close their exit ends with a plate or disk, which is provided with an aperture of much smaller diameter than that of the pipe, as plainly shown in Fig. 12 of the drawings. By this device I am enabled to check the otherwise rapid current through the pipe.

Having thus described my invention, what I claim, and desire to secure by Letters Patent, is—

1. The air-duct P, with water-pipes and shower-bath, and valves Q, in combination with ventilators $B'$ $B''$, registers R, and the devices herein described for cooling or freezing.

2. The chambers S, and apparatus for cooling the same, when arranged in a market-house or storehouse, as described, in combination with a railroad-track, as and for the purposes set forth.

3. The combination of the devices herein shown, whereby air and liquids may be cooled by several processes successively applied, as described.

4. The combination of devices whereby the temperature of several apartments of a building, box, or vessel may be regulated at will, as described.

5. The combination of devices described, whereby air in several adjoining apartments may be cooled, dried, or purified separately or together, as described.

D. E. SOMES.

Witnesses:
ADDISON M. SMITH,
F. C. SOMES.